Oct. 22, 1963     O. G. BARNUM     3,107,907
SHOCK ABSORBING AXLE MOUNT FOR VEHICLES
Filed May 14, 1962                2 Sheets-Sheet 1
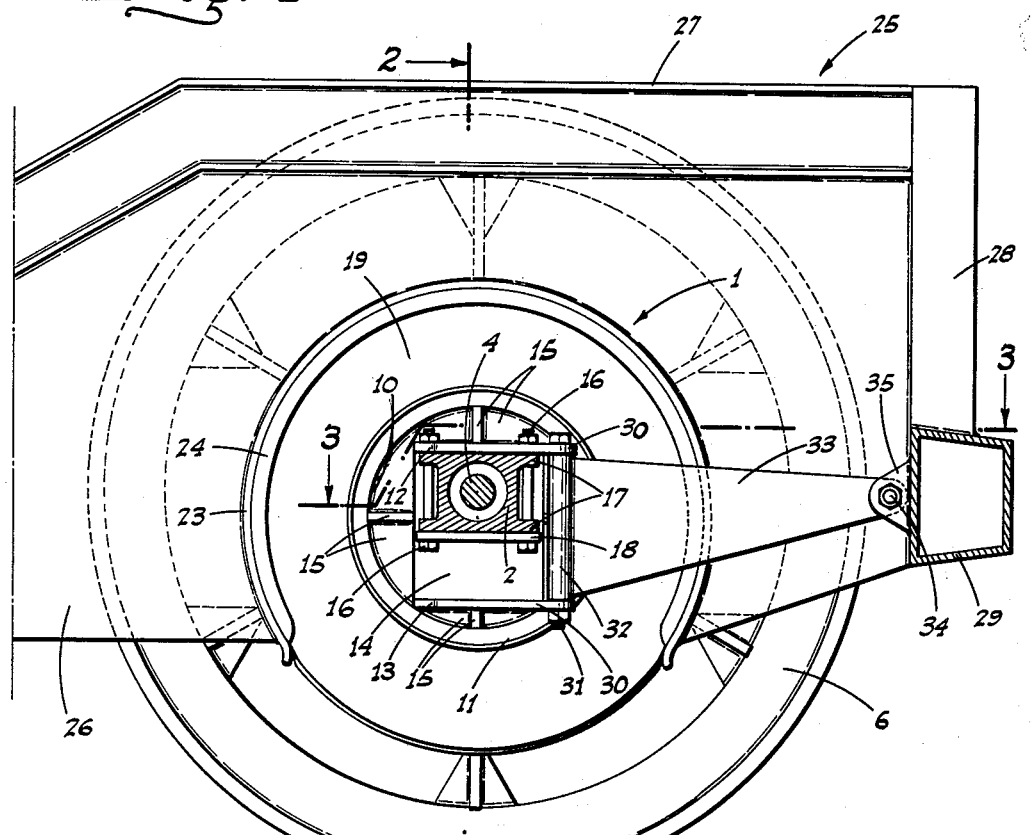
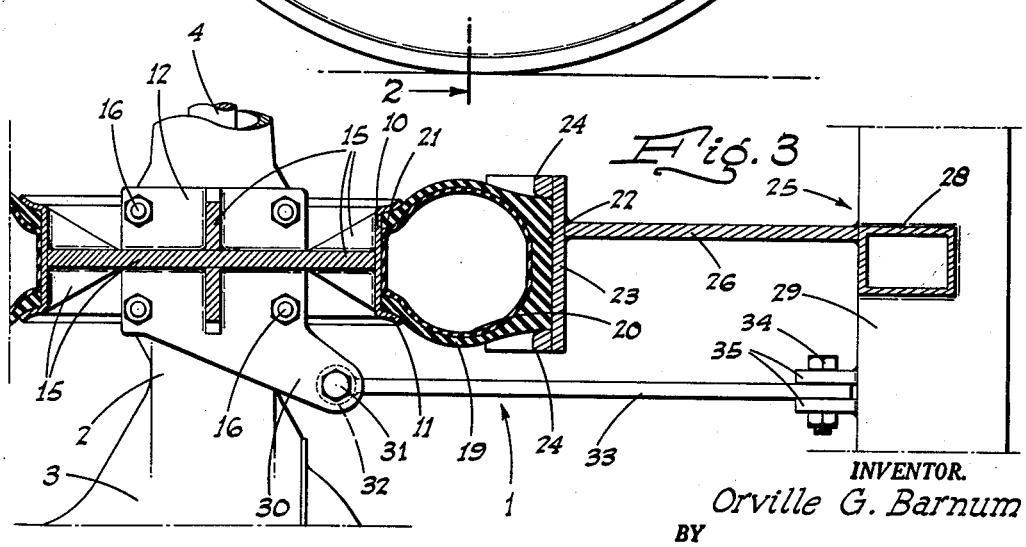
INVENTOR.
Orville G. Barnum
BY
Webster & Webster
ATTYS.

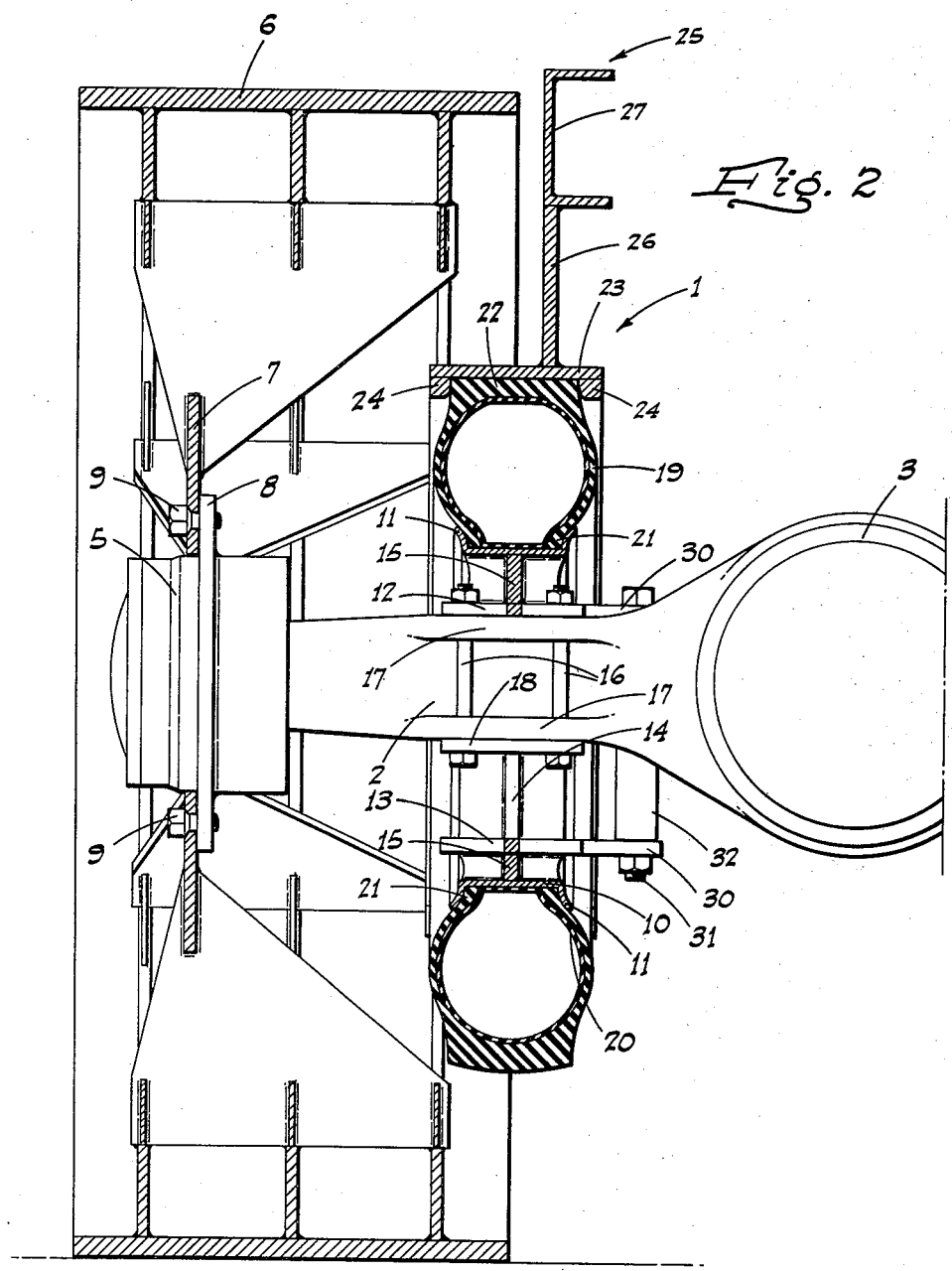

United States Patent Office

3,107,907
Patented Oct. 22, 1963

3,107,907
SHOCK ABSORBING AXLE MOUNT FOR
VEHICLES
Orville G. Barnum, Portland, Oreg., assignor to Pactor
Corporation, West Sacramento, Calif., a corporation of
California
Filed May 14, 1962, Ser. No. 194,522
3 Claims. (Cl. 267—65)

This invention relates to, and it is a major object to provide, a novel shock absorbing mount between the axle housing and frame of a motor vehicle; the mount attaching the axle housing to the frame and serving in substitution for the conventional spring unit.

The present shock absorbing mount is especially designed, but not limited, for use on heavy-duty industrial or earth working vehicles wherein the wheels and axle housings are subject to relatively heavy loads and substantial road shock; the mount being adapted to effectively carry such loads while minimizing the shock transmitted to the vehicle frame, as well as the driving mechanism thereon.

Another important object of the invention is to provide a shock absorbing mount, as above, wherein the shock cushioning effect is attained by the inclusion in the mount of an inflated tire, supported by a novel carrier structure, in surrounding relation to the axle housing.

An additional object of the invention is to provide a shock absorbing mount, for the purpose described, which is effective to cushion or damp shock transmitted from the axle housing vertically, longitudinally, or transversely relative to the vehicle frame; the mount also absorbing the torsional effect of rotation of the axle under power.

It is also an object of the invention to provide a practical, reliable, and durable shock absorbing axle mount for vehicles, and one which will be exceedingly effective for the purpose for which it is designed.

These objects are accomplished by means of such structure and relative arrangement of parts as will fully appear by a perusal of the following specification and claims.

In the drawings:

FIG. 1 is an elevation of the mount as in use; the view looking at such mount from the inner side, and with the axle, axle housing, and a portion of the frame in section.

FIG. 2 is an enlarged transverse sectional elevation on line 2—2 of FIG. 1.

FIG. 3 is a fragmentary sectional plan on line 3—3 of FIG. 1.

As each of the mounts included in a vehicle are substantially identical, only one such mount is shown and described.

Referring now more particularly to the drawings, and to the characters of reference marked thereon, the mount, indicated generally at 1, is disposed in the main in surrounding relation to an axle housing 2 projecting laterally outwardly from the differential 3 of the vehicle. The axle housing 2 encloses the conventional axle 4 which is fitted at its outer end with a hub 5.

The related vehicle wheel 6 surrounds the sub 5; such wheel including within its confines an attachment ring 7 secured to a radial flange 8 on hub 5 by cap screws 9. The type of wheel forms no part of the present invention.

The mount 1, as disposed in a lateral plane between the differential 3 and the wheel supporting hub 5, comprises the following:

An inner, radially outwardly facing, circular tire rim 10 surrounds the axle housing 2; such rim including tire bead retention flanges 11. An upper horizontal plate 12 and a lower horizontal plate 13 are disposed in vertically spaced relation within the tire rim 10 and define the top and bottom of a rectangular opening 14; the plates 12 and 13 being rigidly affixed to the tire rim 10 by radial webbing 15.

The axle housing 2, which has a flat top and bottom in the zone of the mount, extends transversely through the opening 14 with the upper plate 12 resting on top of said axle housing and the lower plate 13 spaced therebelow. The upper plate 12 is rigidly attached to the axle housing 2 by means of a shackle assembly including bolts 16 extending through flanges 17 and connected between said upper plate 12 and a spanner plate 18 engaged against the bottom of said axle housing.

With the above arrangement the tire rim 10 is rigidly attached to the axle housing 2 in surrounding relation.

A conventional but heavy-duty pneumatic tire 19, having an inner tube 20 therein, is carried on the rim 10 with the tire beads 21 confined by the retention flanges 11; the tube 20 being adapted to be inflated through the usual valve stem (not shown).

The crown or tread portion 22 of the tire 19 is encompassed by or retained in an outer, radially inwardly facing, arcuate rim 23 which extends about the tire except for a portion—of less than 180 degrees—at the bottom thereof; the open bottom portion of said rim, as shown in FIG. 1, being for the purpose of permitting initial engagement of tire 19 in said arcuate rim 23.

Such arcuate rim 23 includes, at the edges, radially inwardly projecting flanges 24 which prevent lateral displacement of the tire crown 22 relative to rim 23 and against which rim said crown tightly bears between the flanges 24. The tight engagement between tire crown 22 and rim 23 is attained upon inflation of the inner tube 20, together with the fact that the inside diameter of such rim 23 is slightly less than the maximum outside diameter which the tire 19 would otherwise assume upon inflation of the inner tube 20.

The outer rim 23 is fixed in connection with an adjacent portion of the vehicle frame, indicated generally at 25, by means of a longitudinally extending, vertical plate 26 secured—as by welding—to said rim 23 about its entire arcuate extent. Such adjacent portion of the frame 23 includes a longitudinal beam 27 above the outer rim 23, together with a post 28 and a cross beam 29 rearwardly thereof. The plate 26 extends to, and is welded in rigid connection with, said longitudinal beam 27, post 28, and cross beam 29; all whereby the outer rim 23 is rigid with the vehicle frame 25.

Ears 30, integral with the laterally innermost edges of the plates 12 and 13, project at a rearward and inward diagonal therefrom in vertical alinement; a bolt 31 connecting between such ears, and with a sleeve 32 surrounding said bolt 31. A longitudinal stay bar 33 is formed rigid with the sleeve 32 and extends rearwardly therefrom at a right angle to axle housing 2; such stay bar being attached at its rear end to the cross beam 29 by a cross bolt 34, preferably with a rubber bushing, connected between transversely spaced ears 35 on said cross beam 29 and which ears straddle said rear end of the stay bar.

The mount, as described, provides a simple but most effective structure for connecting the axle housing 2 to the frame 25, and such mount—by reason of the inclusion of the inflated pneumatic tire 19—functions to minimize, by a cushioning or absorbing effect, the translation of road shock or vibration from the wheel 6 and axle housing 2 to said frame 25. In order to obtain the maximum shock absorbing action, the pressure to which the tire is inflated may be varied according to the load on the vehicle, or the character of the surface being traversed.

The stay bar 33, connected as described, prevents any tendency to torsional motion or part-rotation of the axle housing 2 due to reaction when driving power is applied to the axle 4 and wheel 6, and which tendency to torsional motion or part-rotation of said housing would be otherwise undesirably imparted to the tire 19.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A shock absorbing axle mount for a vehicle having a transversely extending axle housing, an axle in the housing, a wheel on the axle at the outer end of the axle housing, and a frame portion spaced above said axle housing; the mount comprising a radially outwardly facing inner rim surrounding the axle housing, means rigidly securing the inner rim to the axle housing, an outer radially inwardly facing rim of greater diameter than and surrounding the inner rim in spaced concentric relation, means rigidly securing said outer rim to the frame portion, and an inflated tire on the inner rim, the tire having a crown tightly engaged in the outer rim; the lower portion of the outer rim being cut away for an arcuate extent greater than 90 degrees but less than 180 degrees.

2. A shock absorbing axle mount for a vehicle having a transversely extending axle housing, an axle in the housing, a wheel on the axle at the outer end of the axle housing, and a frame portion spaced above said axle housing; the mount comprising a radially outwardly facing inner rim surrounding the axle housing, means rigidly securing the inner rim to the axle housing, an outer radially inwardly facing rim of greater diameter than and surrounding the inner rim in spaced concentric relation, means rigidly securing said outer rim to the frame portion, and an inflated tire on the inner rim, the tire having a crown tightly engaged in the outer rim; said inner rim securing means comprising an upper plate and a lower plate fixed in vertically spaced relation within said inner rim, the axle housing projecting between said upper and lower plates, and a shackle assembly rigidly securing one of said plates to the axle housing; said upper and lower plates having vertically alined ears thereon clear of said inner rim, a vertical bolt connected between the ears, a sleeve on the bolt, a longitudinal stay bar fixed at one end to the sleeve, the frame portion having a fixed member adjacent the other end of the longitudinal stay bar, and means transversely pivotally connecting said other end of the stay bar to said fixed member.

3. A shock absorbing axle mount for a vehicle having a transversely extending axle housing, an axle in the housing, a wheel on the axle at the outer end of the axle housing, and a frame portion spaced above said axle housing; the mount comprising a radially outwardly facing inner rim surrounding the axle housing, an outer radially inwardly facing rim of greater diameter than and substantially surrounding the inner rim in spaced concentric relation and below said frame portion, means rigidly securing said outer rim to the frame portion, an inflated tire on the inner rim, the tire having a crown tightly engaged in the outer rim, a web within the area defined by the inner rim and rigid therewith, said web having an enlarged opening through which the axle housing passes in clearance relation, means removably securing the web to the axle housing and including an upper plate resting on said housing and rigid with the web at the top of the opening and projecting on both sides of the web, another plate within the opening separate from the web engaging the under face of the axle housing and parallel to the first plate, and bolts at the sides of the axle housing connecting the plates together and in clamping relation wtih the housing.

References Cited in the file of this patent

UNITED STATES PATENTS

| 1,439,617 | Dobbins et al. | Dec. 19, 1922 |
| 2,204,415 | Johnston | June 11, 1940 |
| 2,900,197 | Hutchens | Apr. 18, 1959 |

FOREIGN PATENTS

| 20,484 | Great Britain | Sept. 14, 1907 |
| 454,314 | Great Britain | June 24, 1934 |
| 19,218 | Norway | Aug. 9, 1909 |